(12) United States Patent
Onishi et al.

(10) Patent No.: US 10,960,820 B2
(45) Date of Patent: Mar. 30, 2021

(54) VEHICLE PERIPHERY IMAGE DISPLAY DEVICE AND VEHICLE PERIPHERY IMAGE DISPLAY METHOD

(71) Applicant: Mitsubishi Electric Corporation, Tokyo (JP)

(72) Inventors: Kenta Onishi, Tokyo (JP); Yoichi Kato, Tokyo (JP); Nariaki Takehara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/626,160

(22) PCT Filed: Aug. 3, 2017

(86) PCT No.: PCT/JP2017/028273
§ 371 (c)(1),
(2) Date: Dec. 23, 2019

(87) PCT Pub. No.: WO2019/026246
PCT Pub. Date: Feb. 7, 2019

(65) Prior Publication Data
US 2020/0215977 A1 Jul. 9, 2020

(51) Int. Cl.
*B60R 1/00* (2006.01)
*H04N 7/18* (2006.01)
*G08G 1/16* (2006.01)

(52) U.S. Cl.
CPC ............ *B60R 1/002* (2013.01); *G08G 1/168* (2013.01); *H04N 7/181* (2013.01);
(Continued)

(58) Field of Classification Search
CPC ............ B60R 1/002; B60R 2300/105; B60R 2300/806; B60R 2300/607; B60R 2300/30; G08G 1/168; H04N 7/181
See application file for complete search history.

(56) References Cited

U.S. PATENT DOCUMENTS

2007/0088474 A1* 4/2007 Sugiura ............ B62D 15/0275
701/36
2008/0007618 A1* 1/2008 Yuasa ...................... B60R 1/00
348/118
(Continued)

FOREIGN PATENT DOCUMENTS

CN   102696225 A   9/2012
JP   2006-238131 A   9/2006
(Continued)

OTHER PUBLICATIONS

International Search Report for PCT/JP2017/028273 dated Oct. 31, 2017 [PCT/ISA/210].
(Continued)

*Primary Examiner* — Clifford Hilaire
*Assistant Examiner* — Tyler B Edwards
(74) *Attorney, Agent, or Firm* — Sughrue Mion, PLLC; Richard C. Turner

(57) ABSTRACT

Provided are a vehicle periphery image display apparatus and a vehicle periphery image display method, which enable a driver to recognize a deviation between a parking frame and an own vehicle more easily at a time of a parking operation. The configuration includes: continuously inputting a periphery image of an own vehicle in a parking lot, which has been photographed by a plurality of photographing devices; storing the periphery image; compensating for, in the input periphery image, a lost image part with the stored periphery image to combine the compensated lost image part with the input periphery image; generating a top-view image seen from right above a top of the own vehicle based on the combined periphery image; generating a displayed image including the top-view image; and displaying the generated displayed image.

20 Claims, 14 Drawing Sheets

(52) U.S. Cl.
CPC ..... *B60R 2300/105* (2013.01); *B60R 2300/30* (2013.01); *B60R 2300/607* (2013.01); *B60R 2300/806* (2013.01)

(56) References Cited

U.S. PATENT DOCUMENTS

2012/0296523 A1    11/2012  Ikeda et al.
2016/0075377 A1*   3/2016  Tomozawa ................ B60R 1/00
                                                            701/41

FOREIGN PATENT DOCUMENTS

| JP | 2006238131 A | * | 9/2006 |
| JP | 2007-90939 A | | 4/2007 |
| JP | 2011-66657 A | | 3/2011 |
| JP | 2012-96585 A | | 5/2012 |
| JP | 5134504 B2 | | 11/2012 |
| JP | 2015-154125 A | | 8/2015 |

OTHER PUBLICATIONS

Communication dated Dec. 23, 2020, issued by the National Intellectual Property Office of the People's Republic of China in application No. 201780093252.5.

* cited by examiner

VEHICLE PERIPHERY IMAGE DISPLAY DEVICE AND VEHICLE PERIPHERY IMAGE DISPLAY METHOD

CROSS REFERENCE TO RELATED APPLICATIONS

This application is a National Stage of International Application No. PCT/JP2017/028273, filed on Aug. 3, 2017.

TECHNICAL FIELD

The present invention relates to a vehicle periphery image display apparatus and a vehicle periphery image display method, and more particularly, to operation support for a driver at the time of a parking operation.

BACKGROUND ART

A related art disclosed in Patent Literature 1 given below relates to a vehicle periphery observation system configured to enable a driver to recognize situations of angles of tires and a frame line by transforming and displaying an image so that a video image displayed by a side-view camera achieves a natural angle for the driver, that is, so that the video image is viewed from the viewpoint of the driver.

A related art disclosed in Patent Literature 2 given below relates to a vehicle periphery image display apparatus configured to hold front-view and rear-view camera images as history information, and use an image of a part to be a blind spot when a vehicle moves backward, for example, which is included in the history information, to thereby display a specific position of the blind spot in a current image.

CITATION LIST

Patent Literature

[PTL 1] JP 5134504 B2
[PTL 2] JP 2015-154125 A

SUMMARY OF INVENTION

Technical Problem

The related art disclosed in Patent Literature 1 processes a video image so that the driver can easily recognize the current angles of tires and a frame line, for example. However, there is a problem in that the driver has a difficulty in recognizing how the entire vehicle body is inclined with respect to the frame line based on the displayed vehicle body and tires.

The related art disclosed in Patent Literature 2 tries to recognize a nearby obstacle based on history information on images acquired by front-view and rear-view cameras. However, the side-view camera is not used, and there is a problem in that a synthesized image, for example, a top-view image being an image of the vehicle seen from right above the top of the vehicle obtained from images of side-view and rear-view cameras, for example, cannot be used to improve recognition by the driver.

Further, the related art disclosed in Patent Literature 2 recognizes a nearby moving object and obstacle, and does not execute any processing for a frame line at the time of a parking operation. As a result, the related art cannot enable the driver to easily recognize a deviation between the frame line and the own vehicle at the time of a parking operation.

The present invention has an object to provide a vehicle periphery image display apparatus and a vehicle periphery image display method, which enable a driver to recognize a deviation between a parking frame and an own vehicle more easily at the time of a parking operation.

Solution to Problem

According to one embodiment of the present invention, there are provided a vehicle periphery image display apparatus and the like including: a plurality of photographing devices configured to photograph a periphery of an own vehicle in a parking lot; an image signal input unit configured to continuously receive input of an image signal of a periphery image of the own vehicle photographed by the plurality of photographing devices; a history storage unit configured to store the image signal, which has been input to the image signal input unit, as the periphery image for each of the plurality of photographing devices; an image compensation processing unit configured to compensate for, in the periphery image input to the image signal input unit, a lost image part by the periphery image stored in the history storage unit, and combine the compensated lost image part with the periphery image input to the image signal input unit; a top-view image generation unit configured to generate a top-view image seen from right above a top of the own vehicle based on the combined periphery image; a display image generation unit configured to generate a displayed image including the top-view image generated by the top-view image generation unit; and a display device configured to display the displayed image generated by the display image generation unit.

Advantageous Effects of Invention

According to the present invention, in the periphery image input to the image signal input unit, the lost image part is compensated for by the image stored in the history storage unit, and the compensated image is combined with the periphery image input to the image signal input unit. Then, the top-view image is generated based on the combined periphery image, and the top-view image is displayed on the display device. With this, it is possible to provide the vehicle periphery image display apparatus and the vehicle periphery image display method, which enable the driver to recognize the deviation between the parking frame and the own vehicle more easily at the time of the parking operation.

DESCRIPTION OF EMBODIMENTS

The present invention provides a vehicle periphery image display apparatus and a vehicle periphery image display method, which enable a driver to easily recognize a deviation between a parking frame and an own vehicle at the time of a parking operation.

For example, the driver is enabled to easily recognize how much the own vehicle is inclined with respect to the parking frame based on an image, for example, a top-view image obtained from video images of left and right side-view video cameras and front-view and rear-view video cameras at the time of a parking operation by the driver in a parking lot.

Further, a blind-spot region for the driver at the time of a parking operation changes in real time, and thus not only a video camera image but also a top-view image or the like is used to enable the driver to visually recognize a deviation of the inclination of the own vehicle with respect to the parking frame.

Further, the driver is enabled to easily recognize a blind spot for the driver by setting an image of a part of the own vehicle to be transparent and superimposing an image of a road surface onto the image of the part of the own vehicle to cope with a problem in that the driver has a difficulty in recognizing the state of the road surface due to the image of the own vehicle in the top-view image and the image of each video camera.

Now, a vehicle periphery image display apparatus and a vehicle periphery image display method according to each embodiment of the present invention are described with reference to the drawings. In the embodiments, like or corresponding parts are denoted by like symbols, and redundant descriptions are omitted.

Figure 1:
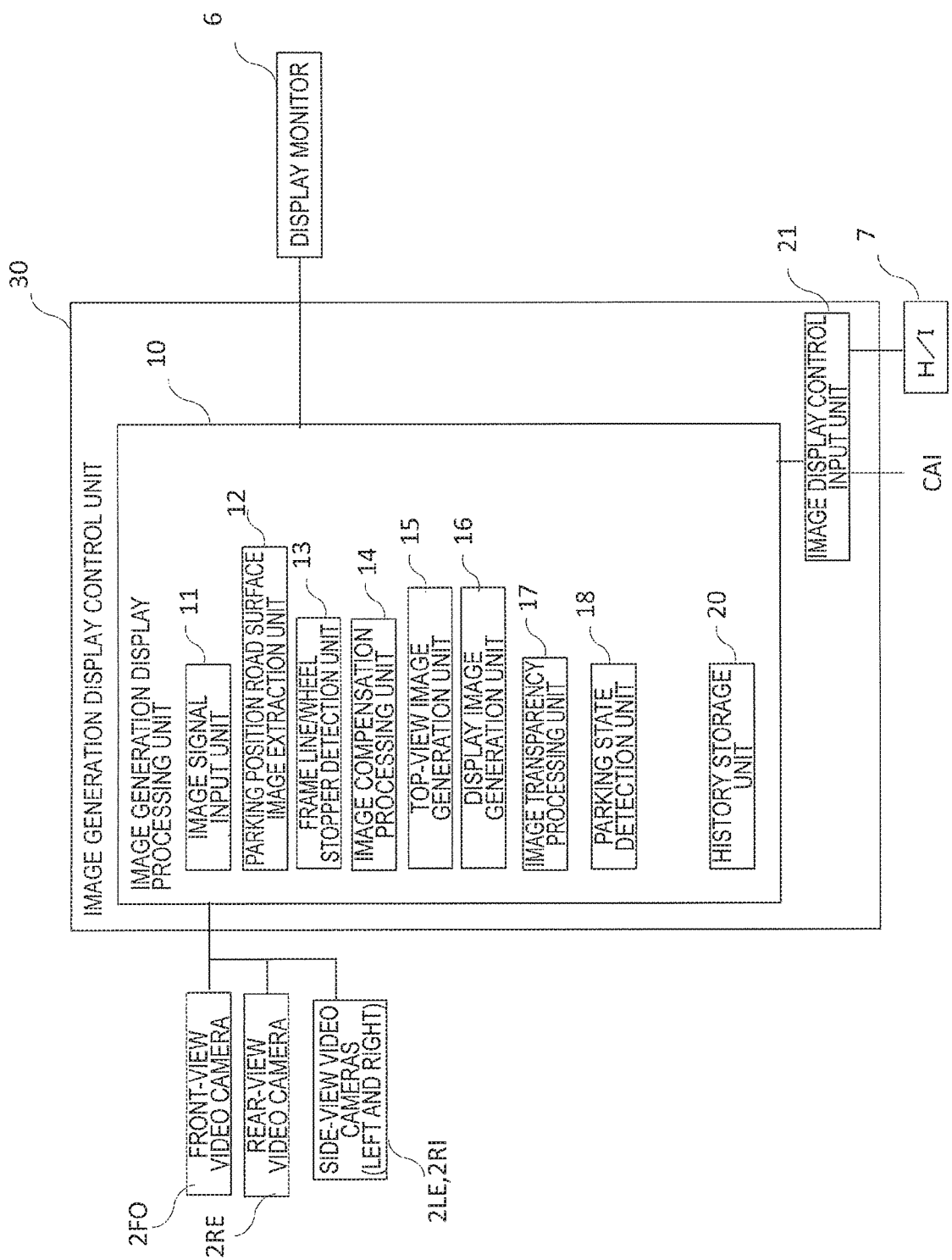
FIG. 1 is a block diagram for illustrating an example of a configuration of a vehicle periphery image display apparatus according to the present invention.
Figure 2:
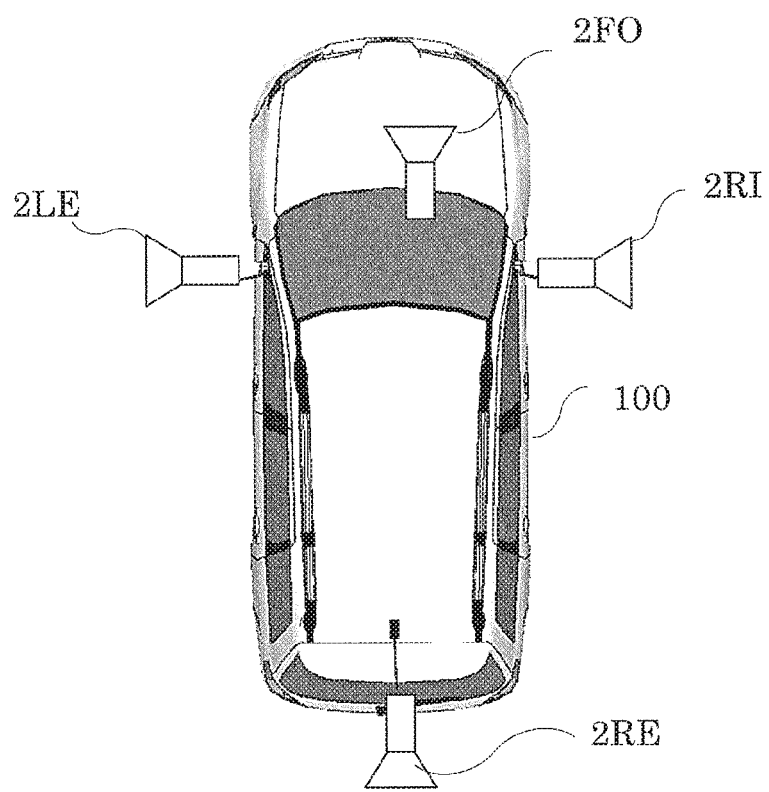
FIG. 2 is a diagram for illustrating an example of installation of each video camera to be mounted to an own vehicle of the vehicle periphery image display apparatus according to the present invention.

FIG. 1 is a block diagram for illustrating an example of a configuration of the vehicle periphery image display apparatus according to the present invention. In the present invention, a front-view video camera 2FO, side-view video cameras 2LE and 2RI, and a rear-view video camera 2RE are mounted to front, left and right, and rear sides of the own vehicle, respectively. The front-view video camera 2FO is mounted to such a position of the own vehicle as to enable the front-view video camera 2FO to photograph a predetermined range of a set angle of the front view of the own vehicle. The side-view video cameras 2LE and 2RI are mounted to such positions of the own vehicle as to enable the side-view video cameras 2LE and 2RI to photograph predetermined left and right ranges of a set angle enabling recognition of left and right frame lines from a road of a general parking lot. The rear-view video camera 2RE is mounted to such a position of the own vehicle as to enable the rear-view video camera 2RE to photograph a predetermined range of a set angle of the rear view of the own vehicle. An example of positions at which the video cameras 2FO, 2LE, 2RI, and 2RE are mounted on the own vehicle 100 is illustrated in FIG. 2. Those video cameras may be mounted at positions other than those illustrated in FIG. 2 as long as those positions satisfy the above-mentioned photography range of the set angle.

The video cameras 2FO, 2LE, 2RI, and 2RE each serve as an image pickup device.

An image generation display control unit 30 of FIG. 1 receives input of a periphery image of the own vehicle from the video cameras 2FO, 2LE, 2RI, and 2RE. Then, the image generation display control unit 30 subjects the periphery image to predetermined processing, and displays a deviation between the parking frame and the own vehicle at the time of a parking operation on a display monitor 6 serving as a display device so that the driver can recognize the deviation more easily. The image generation display control unit 30 includes an image generation display processing unit 10 and an image display control input unit 21.

The image generation display processing unit 10 includes an image signal input unit 11, a parking position road surface image extraction unit 12, a frame line/wheel stopper detection unit 13, an image compensation processing unit 14, a top-view image generation unit 15, a display image generation unit 16, an image transparency processing unit 17, a parking state detection unit 18, and a history storage unit 20.

The image display control input unit 21 receives input of the following signals from the outside of the apparatus.

The driver operates a human interface (H/I) 7 to input a display switching command or the like, and the image display control input unit 21 receives the input display switching command or the like.

Further, the image display control input unit 21 receives input of vehicle information CAI containing, for example, a speed, steering angle of steering wheel, gear information, and parking brake information of the own vehicle.

Now, a description is given of processing to be executed by the vehicle periphery image display apparatus according to the present invention.

First, when the vehicle periphery image display apparatus looks for a parking space within a parking lot, the vehicle periphery image display apparatus photographs a parking frame by the side-view video cameras 2LE and 2RI. The image signal input unit 11 receives input of an image signal of a photographed periphery image of the own vehicle. The input image signal is stored in the history storage unit 20 as a periphery image for each video camera. The vehicle periphery image display apparatus continues photographing until the own vehicle completely stops within the parking frame. The periphery image stored in the history storage unit 20 includes the photographed parking frame, more specifically, at least one of a frame line or a wheel stopper of the parking frame, and a video image of the road surface. The periphery image is updated so that image data acquired within a set period in the past is continuously stored.

The image generation display processing unit 10 controls the display monitor 6 to display a top-view image seen from the right above the top of the own vehicle and periphery images of the respective video cameras 2FO, 2LE, 2RI, and 2RE. The top-view image is generated by the top-view image generation unit 15. The display mode of the display monitor 6 can be changed by a display switching command input through an operation of the H/I 7 by the driver. For example, the image compensation processing unit 14 and the image transparency processing unit 17 subject an image to compensation processing and transparency processing at the time of a parking operation to display the image in which a part of the own vehicle is transparent. The image is displayed without setting a part of the own vehicle to be transparent at a time other than the parking operation.

The frame line/wheel stopper detection unit 13 detects a frame line and a wheel stopper of a parking frame to determine a parking frame in which the own vehicle is to be parked based on the photographed image. When there is no frame line and wheel stopper, the frame line/wheel stopper detection unit 13 detects an obstacle positioned in the parking direction, for example, a wall denoted by "W" in FIG. 6.

The display image generation unit 16 generates an image to be displayed on the display monitor 6 by switching between or synthesizing a top-view image, images of respective video cameras, and images subjected to compensation processing and transparency processing in accordance with the input vehicle information CAI on the own vehicle and display switching command and a processing state in the image generation display processing unit 10. When the frame line/wheel stopper detection unit 13 has detected an object determined to be a parking frame, the display image generation unit 16 displays detection of a frame line on the parking frame in the video camera image when displaying the top-view image and the images of respective video cameras.

The parking state detection unit 18 determines whether the own vehicle is executing a parking operation. In the case of forward perpendicular parking, the parking state detection unit 18 determines that the own vehicle is executing a parking operation when a distance between the frame line of a parking frame, which is viewed in the front-view video camera 2FO, and the position of the own vehicle has become equal to or smaller than a predetermined threshold value. In the case of backward perpendicular parking, the parking state detection unit 18 determines that the own vehicle is executing a parking operation when the vehicle information CAI indicates "R", which means that the gear is put in reverse.

In the case of parallel parking, the parking state detection unit 18 determines that the own vehicle is executing a parking operation when the vehicle information CAI indicates "R", which means that the gear is put in reverse, similarly to the case of backward perpendicular parking. Processing at the time of backward perpendicular parking and processing at the time of parallel parking are the same except for a video image displayed on the display monitor 6.

Further, when the frame line/wheel stopper detection unit 13 has detected a parking frame, the parking state detection unit 18 obtains a distance between the own vehicle and the frame line or wheel stopper of the parking frame in which the own vehicle is to be parked based on the photographed image. The image of each video camera is constantly updated, and thus the parking state detection unit 18 determines that the own vehicle is executing a parking operation when determining that the own vehicle is moving toward the parking frame based on an image one frame before and the current image.

Figure 8:
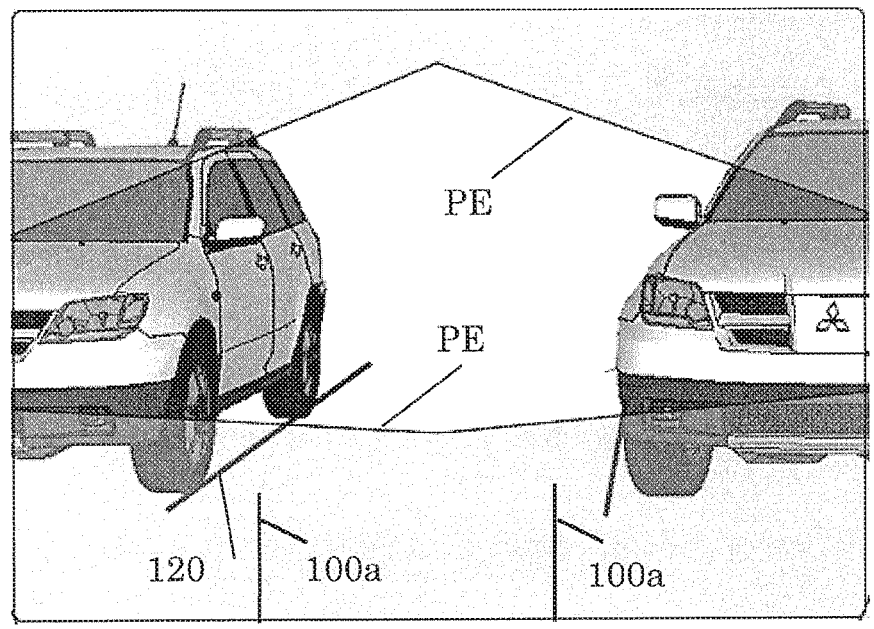
FIG. 8 is a diagram for illustrating an example of the displayed image photographed by the rear-view video camera in the parking mode in the first embodiment of the present invention.
Figure 14:
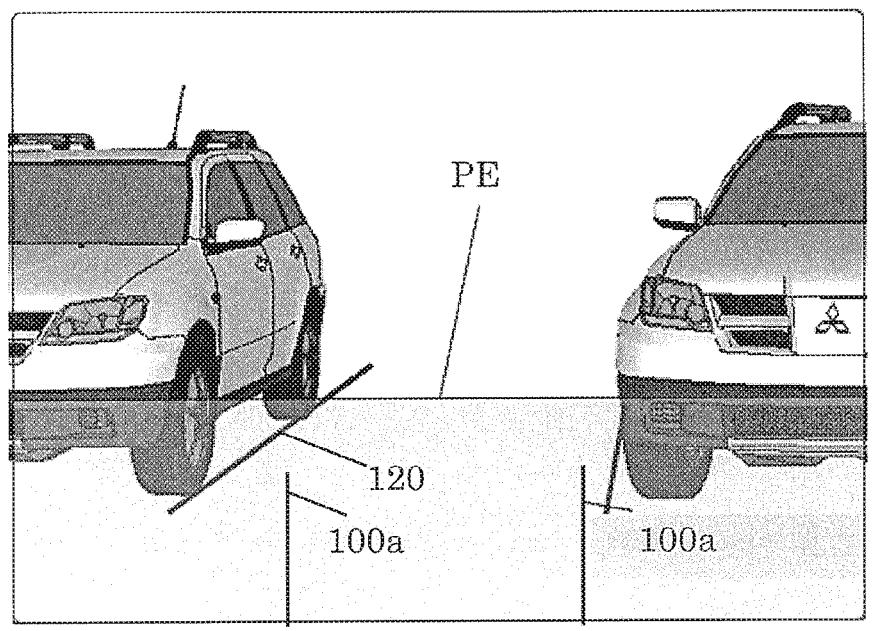
FIG. 14 is a diagram for illustrating an example of the displayed image photographed by the front-view video camera in the parking mode in the second embodiment of the present invention.

When the operation has transitioned to a parking operation, as illustrated as an example in FIG. 8 and FIG. 14 described later, the display image generation unit 16 displays and updates a position 100a of each wheel of the own vehicle in the image of each video camera in real time in an overlapping manner. The position 100a is displayed in each video camera raw image, each video camera bird's eye view image, and the top-view image in an overlapping manner.

Further, the vehicle periphery image display apparatus according to the present invention has a function of detecting a wheel stopper by the front-view video camera 2FO or the rear-view video camera 2RE at the time of a parking operation. The parking state detection unit 18 calculates a distance and angle from the own vehicle to a wheel stopper STP illustrated as an example in FIG. 4 described later. Then, when the wheel stopper STP cannot be seen by a naked eye and a video camera because the wheel stopper STP is blocked by the vehicle body of the own vehicle, for example, the image transparency processing unit 17 enables the own vehicle to be seen in a transparent manner, and the display image generation unit 16 generates a displayed image so as to enable the driver to check the position of the wheel stopper.

Also when a periphery image and a top-view image are displayed by each video camera at the time of a parking operation, the frame line/wheel stopper detection unit 13 detects a frame line and a wheel stopper, and the display image generation unit 16 displays the result of detecting the frame line and the wheel stopper on the screen of the display monitor 6. Then, at the time of a parking operation, a deviation between the own vehicle and a frame line is displayed on the screen based on the frame line or the wheel stopper and the directions of tires and steering angle of steering wheel of the own vehicle obtained from the vehicle information CAI.

With this, the driver can recognize a degree of inclination of the own vehicle with respect to the parking frame, and thus the number of times of turning back or the like at the time of a parking operation decreases. As a result, a load on the driver decreases.

Now, a description is given of a basic operation of a vehicle periphery image display apparatus at the time of a parking operation according to each embodiment of the present invention.

First Embodiment

In a Case of Backward Parking Operation

Figure 3:
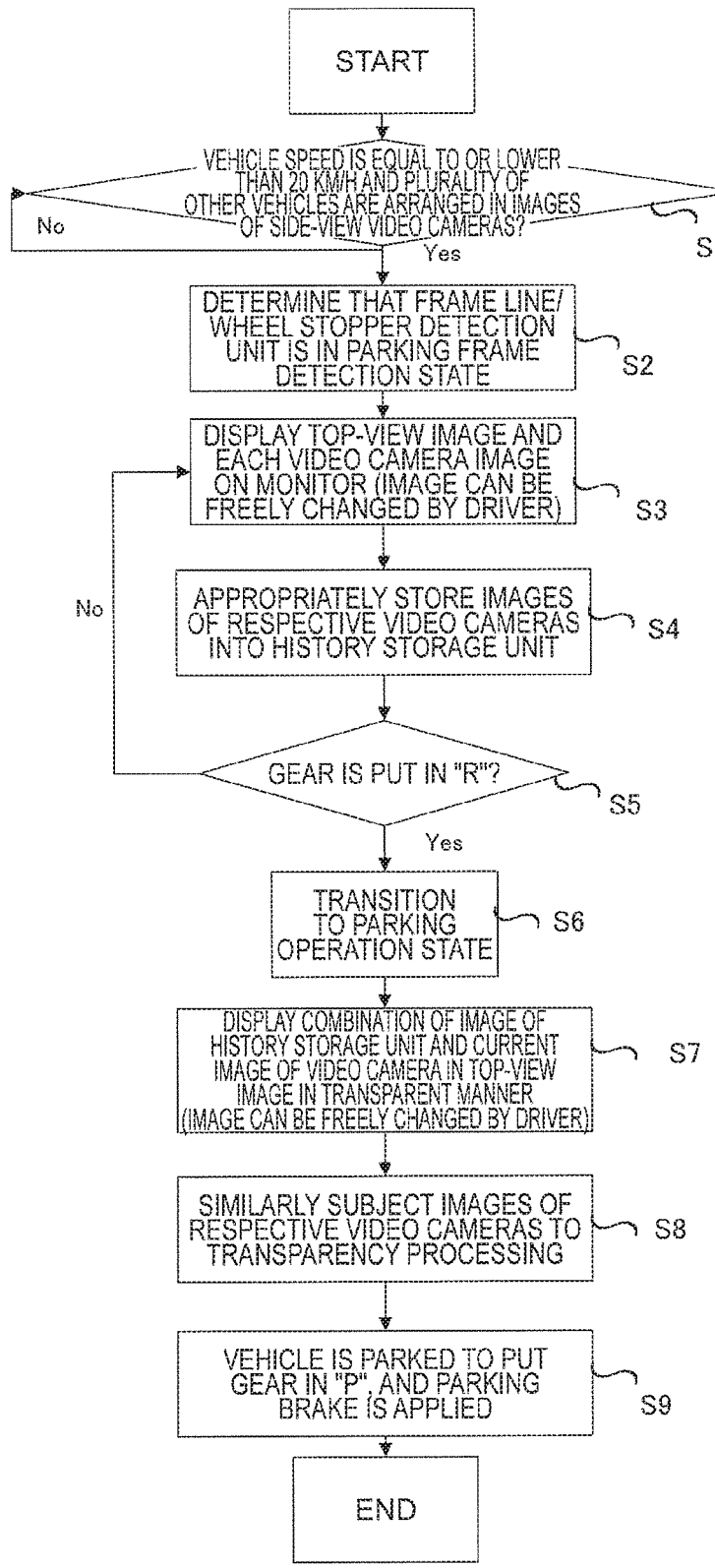
FIG. 3 is an operation flowchart to be applied at the time of a backward perpendicular parking operation in a first embodiment of the present invention and a parallel parking operation in a third embodiment of the present invention.
Figure 4:
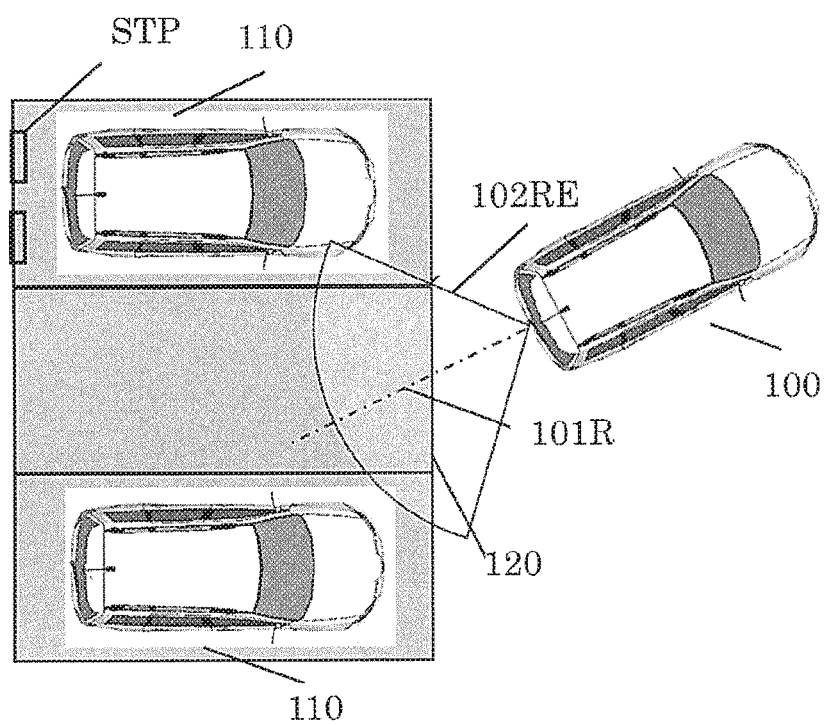
FIG. 4 is a schematic diagram of a periphery of the own vehicle at the time of the backward perpendicular parking operation in the first embodiment of the present invention.

FIG. 3 is an operation flowchart to be applied at the time of a backward perpendicular parking operation in a first embodiment of the present invention and a parallel parking operation in a third embodiment of the present invention. Further, FIG. 4 is a schematic diagram of a periphery of the own vehicle at the time of the backward perpendicular parking operation in the first embodiment. In FIG. 4, there are illustrated an own vehicle 100, a traveling direction 101R of the own vehicle, a photography range 102RE of the rear-view video camera 2RE, other parked vehicles 110, and a parking frame and frame line 120.

Referring to FIG. 3, when the image generation display processing unit 10 determines that a vehicle speed of the own vehicle 100 obtained from the vehicle information CAI is equal to or lower than 20 km/h, for example, and a plurality of other vehicles are arranged in the images of the side-view video cameras 2LE and 2RI (Step S1), the frame line/wheel stopper detection unit 13 is in a parking frame detection state (Step S2).

The display image generation unit 16 displays the top-view image and each video camera image on the display monitor 6 (Step S3). The display format of the display monitor 6 can appropriately be changed by the driver through the H/I 7.

The history storage unit 20 appropriately stores images of the respective video cameras 2FO, 2LE, 2RI, and 2RE (Step S4).

In the case of a backward parking operation, the parking state detection unit 18 detects a timing at which the own vehicle puts the gear in reverse "R" at the time of a parking operation (Step S5), and transitions to a parking operation mode (Step S6).

Then, the screen of the display monitor 6 at the time of a parking operation mode is basically displayed in the top-view image by the display image generation unit 16 and the top-view image generation unit 15. Then, a part of the own vehicle is set to be transparent, and a part of the road surface under the part of the own vehicle is displayed in a transparent manner by the parking position road surface image extraction unit 12, the image compensation processing unit 14, and the image transparency processing unit 17. With this, the driver can check a part of the road surface under the own vehicle. At this time, a combination of the image of the history storage unit 20 and the current image of a video camera is displayed in the top-view image in a transparent manner (Step S7). The driver can freely change the image. Further, the images of respective video cameras 2FO, 2LE, 2RI, and 2RE are similarly subjected to transparency processing and displayed (Step S8).

The image to be displayed on the display monitor 6 can be changed freely by the driver through an operation of the H/I 7 as "top-view image"→"rear-view video camera bird's eye view image"→"rear-view video camera raw image", for example. The top-view image and the rear-view video camera bird's eye view image are displayed in such a manner that the image of a part of the own vehicle is set to be transparent and a part of the road surface blocked by the own vehicle can be seen due to transparency of the own vehicle.

Then, when the parking operation is finished, and the own vehicle puts the gear in parking "P" to apply a parking brake, the parking state detection unit 18 determines that the parking operation is finished (Step S9).

Figure 5:
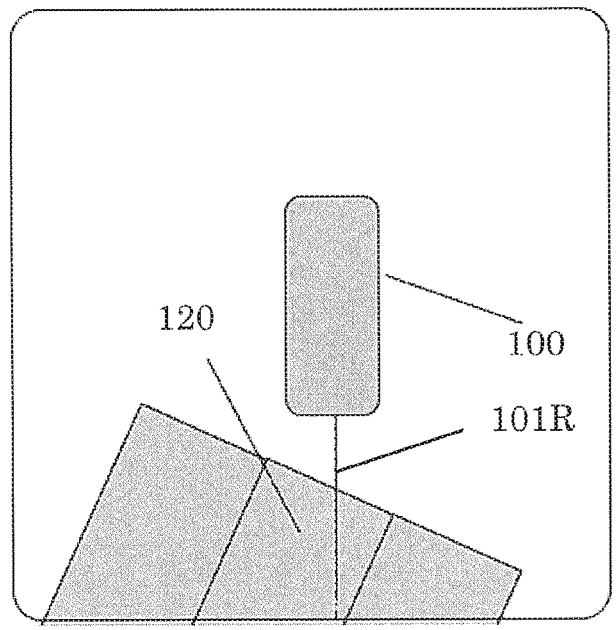
FIG. 5 is a diagram for illustrating an example of a top-view image at the time of the backward perpendicular parking operation in the first embodiment of the present invention.
Figure 6:
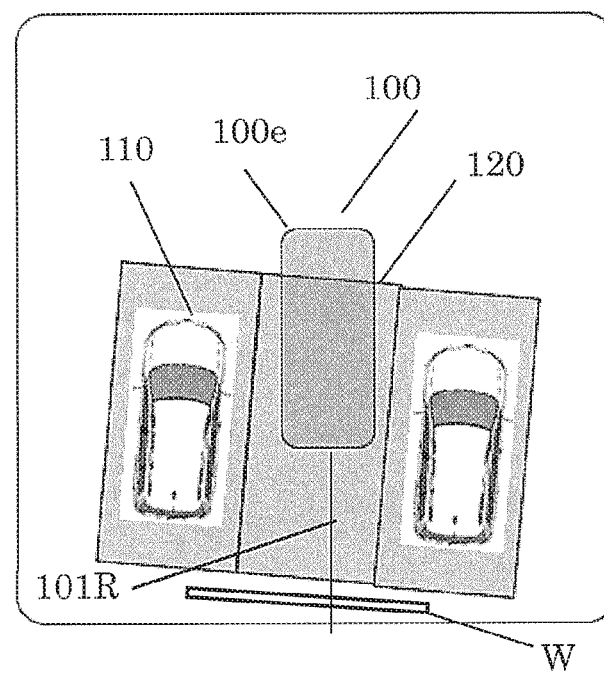
FIG. 6 is a diagram for illustrating a situation in which a part of a parking frame is transparent in the top-view image at the time of the backward perpendicular parking operation in the first embodiment of the present invention.

FIG. 5 is a diagram for illustrating an example of the top-view image at the time of the backward perpendicular parking operation in the first embodiment of the present invention. FIG. 6 is a diagram for illustrating a situation in which a parking frame is transparent in the top-view image at the time of the backward perpendicular parking operation in the first embodiment of the present invention. A part of the own vehicle 100 is set to be transparent, and in FIG. 6, the frame line 120 under the part of the own vehicle 100 is displayed to be seen in a transparent manner.

Figure 7:
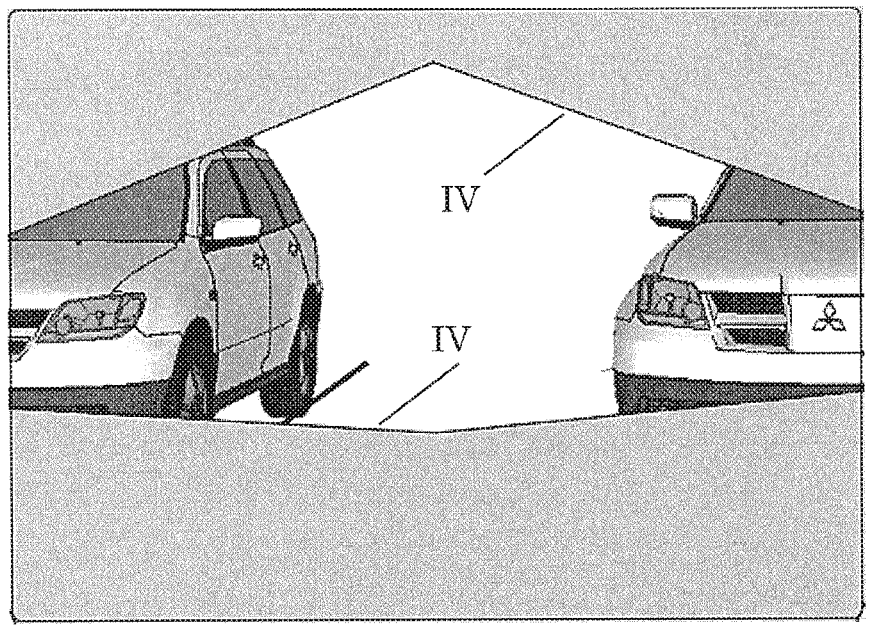
FIG. 7 is a diagram for illustrating an example of a displayed image photographed by a rear-view video camera not in a parking mode in the first embodiment of the present invention.

FIG. 7 is a diagram for illustrating an example of the displayed image photographed by the rear-view video camera not in a parking mode in the first embodiment of the present invention. FIG. 8 is a diagram for illustrating an example of the displayed image photographed by the rear-view video camera in the parking mode in the first embodiment of the present invention. An upper and bottom part IV of the image of FIG. 7 cannot be seen due to the own vehicle. The situation of a vacant parking frame at the time of the backward perpendicular parking operation cannot be seen. In contrast, in FIG. 8, an upper and bottom part PE of the image is displayed in a transparent manner, and the frame line 120 of a vacant parking frame can easily be seen. Further, the display image generation unit 16 may display the position 100a of a wheel of the own vehicle.

Second Embodiment

In a Case of Forward Parking Operation

Figure 9:
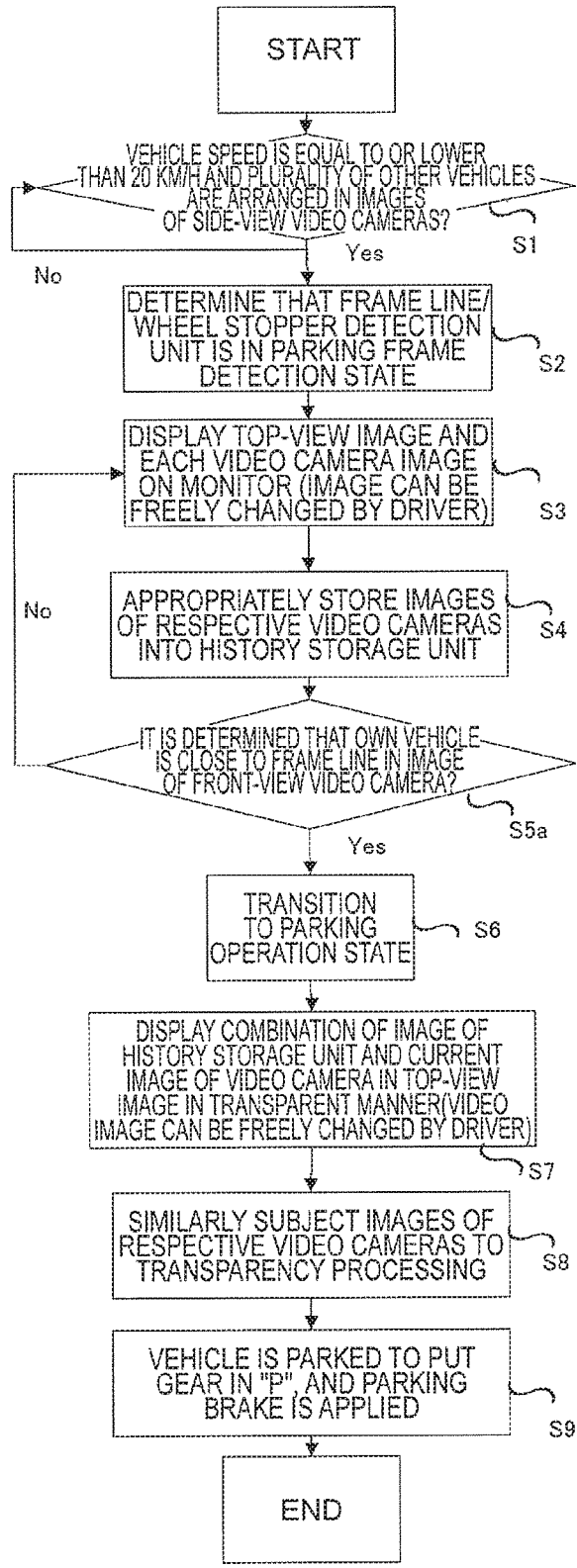
FIG. 9 is an operation flowchart to be applied at the time of a forward perpendicular parking operation in a second embodiment of the present invention.
Figure 10:
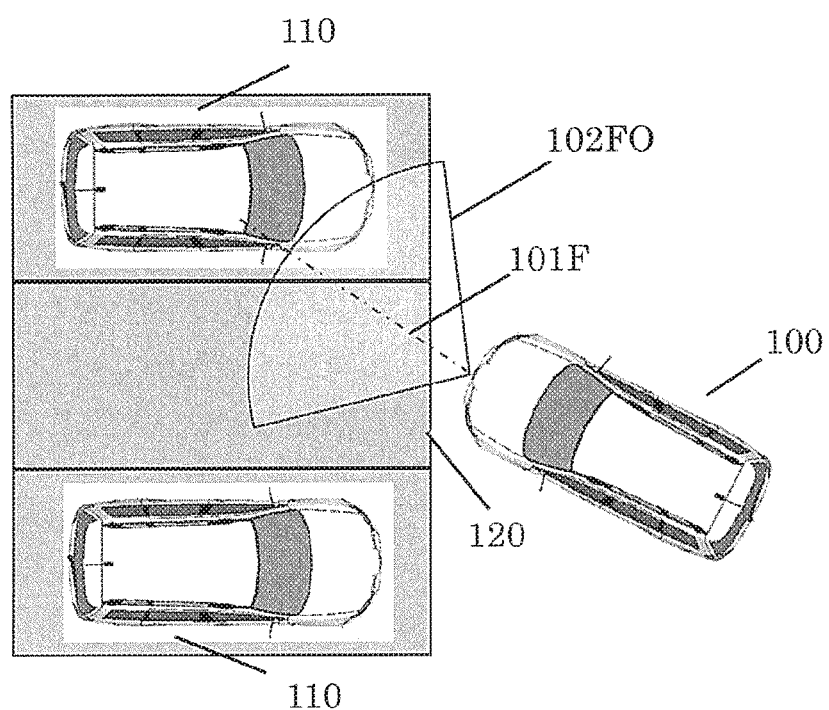
FIG. 10 is a schematic diagram for illustrating the periphery of the own vehicle at the time of the forward perpendicular parking operation in the second embodiment of the present invention.

FIG. 9 is an operation flowchart to be applied at the time of a forward perpendicular parking operation in a second embodiment of the present invention. Further, FIG. 10 is a schematic diagram for illustrating the periphery of the own vehicle at the time of the forward perpendicular parking operation in the second embodiment of the present invention. In FIG. 10, there are illustrated the own vehicle 100, a traveling direction 101F of the own vehicle, a photography range 102FO of the front-view video camera 2FO, the other parked vehicles 110, and the parking frame and frame line 120.

In the case of a forward parking operation, in Step S5a of FIG. 9, the parking state detection unit 18 transitions to a parking mode when the distance between the own vehicle 100 and the frame line 120 of the parking frame has become equal to or smaller than a predetermined threshold value. Then, the top-view image is basically displayed on the screen of the display monitor 6 in the parking mode in the same manner as in the case of a backward parking operation, a part of the own vehicle 100 is set to be transparent, and a part of the road surface is displayed in a transparent manner. As a result, the part of the road surface under the own vehicle can be checked.

Figure 11:
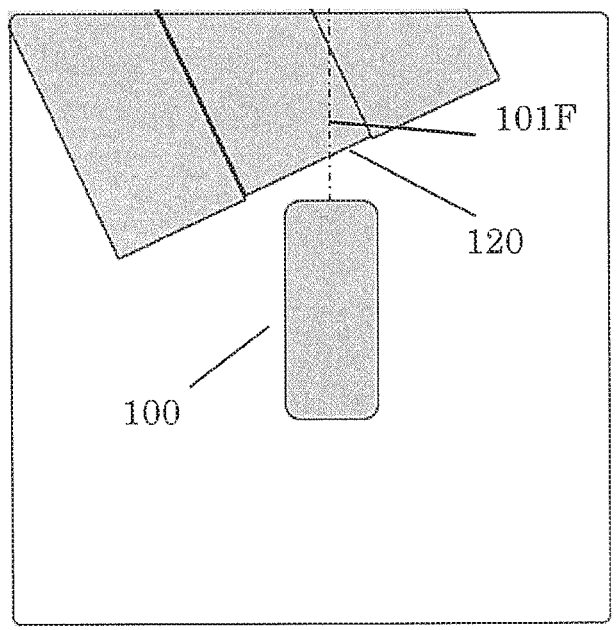
FIG. 11 is a diagram for illustrating an example of the top-view image at the time of the forward perpendicular parking operation in the second embodiment of the present invention.
Figure 12:
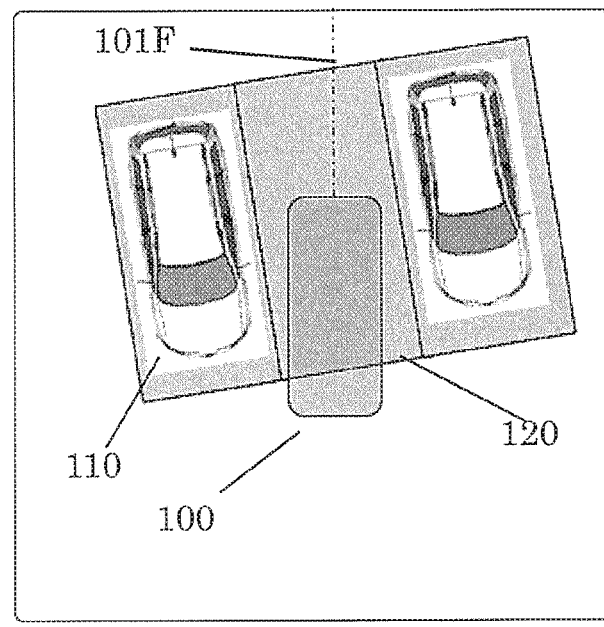
FIG. 12 is a diagram for illustrating a situation in which a part of the parking frame is transparent in the top-view image at the time of the forward perpendicular parking operation in the second embodiment of the present invention.

FIG. 11 is a diagram for illustrating an example of the top-view image at the time of the forward perpendicular parking operation in the second embodiment of the present invention. FIG. 12 is a diagram for illustrating a situation in which a parking frame is transparent in the top-view image at the time of the forward perpendicular parking operation in the second embodiment of the present invention. A part of the own vehicle 100 is set to be transparent, and in FIG. 12, the frame line 120 under the part of the own vehicle 100 is displayed to be seen in a transparent manner.

Figure 13:
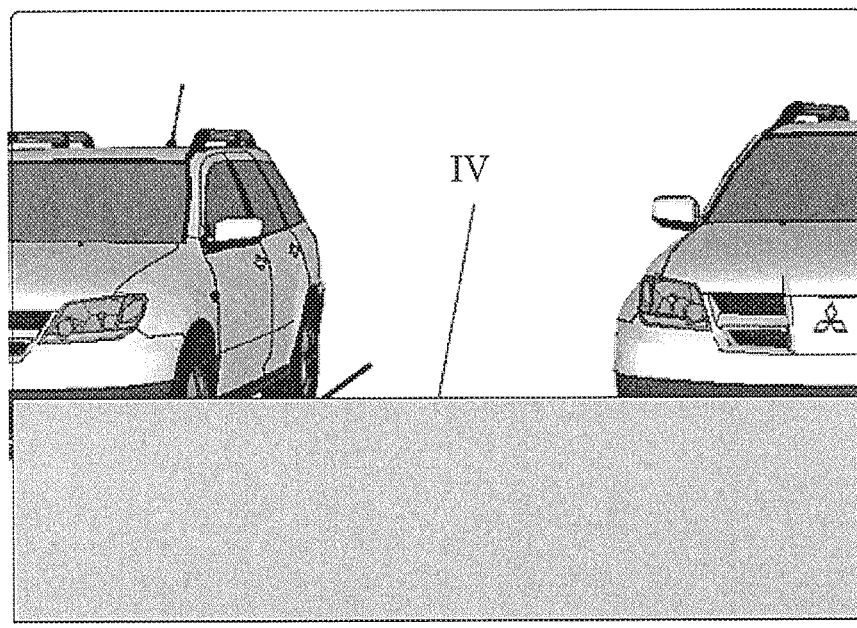
FIG. 13 is a diagram for illustrating an example of the displayed image photographed by a front-view video camera not in the parking mode in the second embodiment of the present invention.

FIG. 13 is a diagram for illustrating an example of the displayed image photographed by the front-view video camera 2FO not in a parking mode in the second embodiment of the present invention. FIG. 14 is a diagram for illustrating an example of the displayed image photographed by the front-view video camera in the parking mode in the second embodiment of the present invention. A bottom part IV of the image of FIG. 13 cannot be seen due to the own vehicle. The situation of a vacant parking frame at the time of the forward perpendicular parking operation cannot be seen. In contrast, in FIG. 14, a bottom part PE of the image is displayed in a transparent manner, and the frame line 120 of a vacant parking frame can easily be seen. Further, the display image generation unit 16 may display the position 100a of a wheel of the own vehicle.

Third Embodiment

In a Case of Parallel Parking Operation

Figure 15:
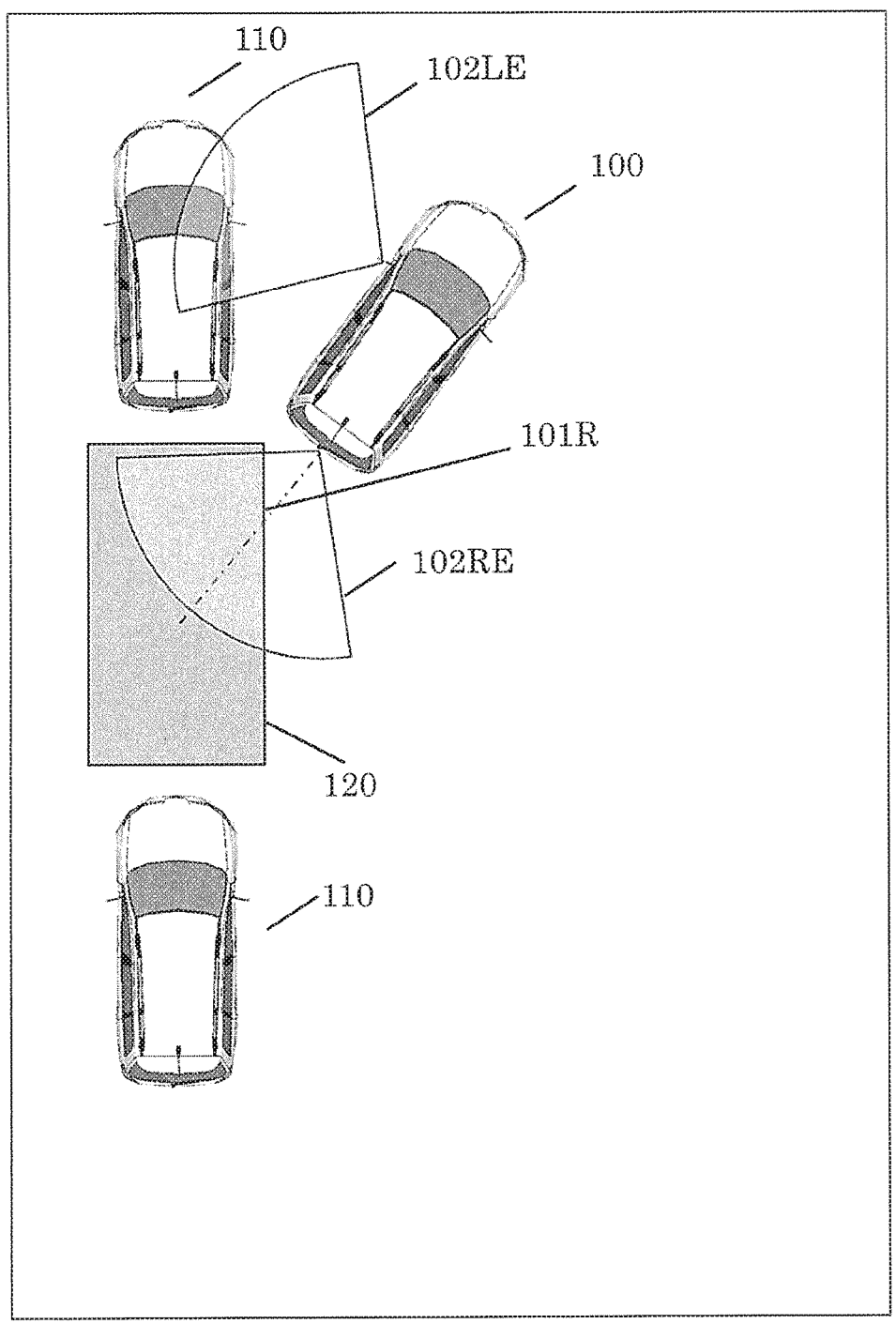
FIG. 15 is a schematic diagram of the periphery of the own vehicle at the time of the parallel parking operation in the third embodiment of the present invention.

An operation flowchart to be applied at the time of a parallel parking operation in a third embodiment of the present invention is the same as that of FIG. 3. Further, FIG. 15 is a schematic diagram for illustrating the periphery of the own vehicle at the time of the parallel parking operation in the third embodiment of the present invention. In FIG. 15, there are illustrated the own vehicle 100, a traveling direction 101R of the own vehicle, a photography range 102RE of the rear-view video camera 2RE, a photography range 102LE of the right side-view video camera 2LE, the other parked vehicles 110, and the parking frame and frame line 120.

In the case of the parallel parking operation, in the same manner as in the backward parking operation of the first embodiment, the parking state detection unit 18 detects a timing at which the own vehicle puts the gear in reverse "R" at the time of a parking operation in Step S5, and transitions to the parking operation mode.

The image to be displayed on the display monitor 6 by the display image generation unit 16 is a combination of an image at the time of the backward parking operation and images of the side-view video cameras 2LE and 2RI. The images of the side-view video cameras 2LE and 2RI are displayed to cope with a possibility that a distance between the own vehicle and the preceding vehicle cannot be grasped at the time of moving back in the parallel parking operation to cause collision.

When the images of the side-view video cameras 2LE and 2RI are displayed, the display image generation unit 16 executes processing of transforming angles of images of the side-view video cameras 2LE and 2RI so that the images can easily be recognized by the driver. With the angle transformation processing, the situation of the distance, angle, and positional relationship between the own vehicle and another vehicle can easily be recognized at a glance of the image of the side-view video camera through the angle transformation processing, and consequently the difficulty in parking decreases.

Figure 16:
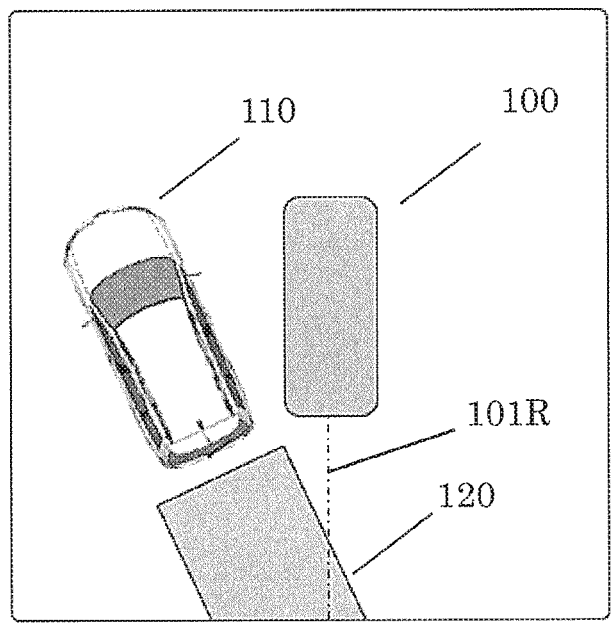
FIG. 16 is a diagram for illustrating an example of the top-view image at the time of the parallel parking operation in the third embodiment of the present invention.
Figure 17:
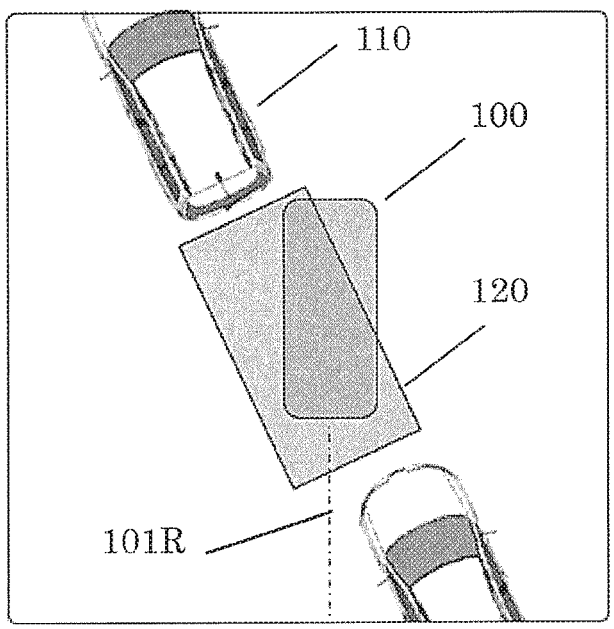
FIG. 17 is a diagram for illustrating a situation in which a part of the parking frame is transparent in the top-view image at the time of the parallel parking operation in the third embodiment of the present invention.

FIG. 16 is a diagram for illustrating an example of the top-view image at the time of the parallel parking operation in the third embodiment of the present invention. FIG. 17 is a diagram for illustrating a situation in which a parking frame is transparent in the top-view image at the time of the parallel parking operation in the third embodiment of the present invention. A part of the own vehicle 100 is set to be transparent, and in FIG. 17, the frame line 120 under the part of the own vehicle 100 is displayed to be seen in a transparent manner.

Figure 18:
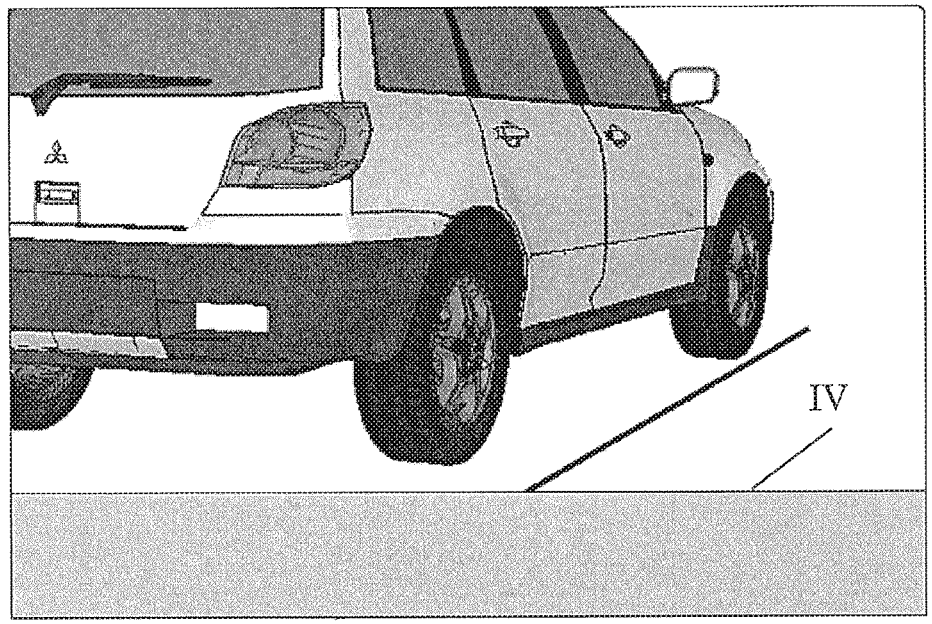
FIG. 18 is a diagram for illustrating an example of the displayed image photographed by a side-view video camera not in the parking mode in the third embodiment of the present invention.
Figure 19:
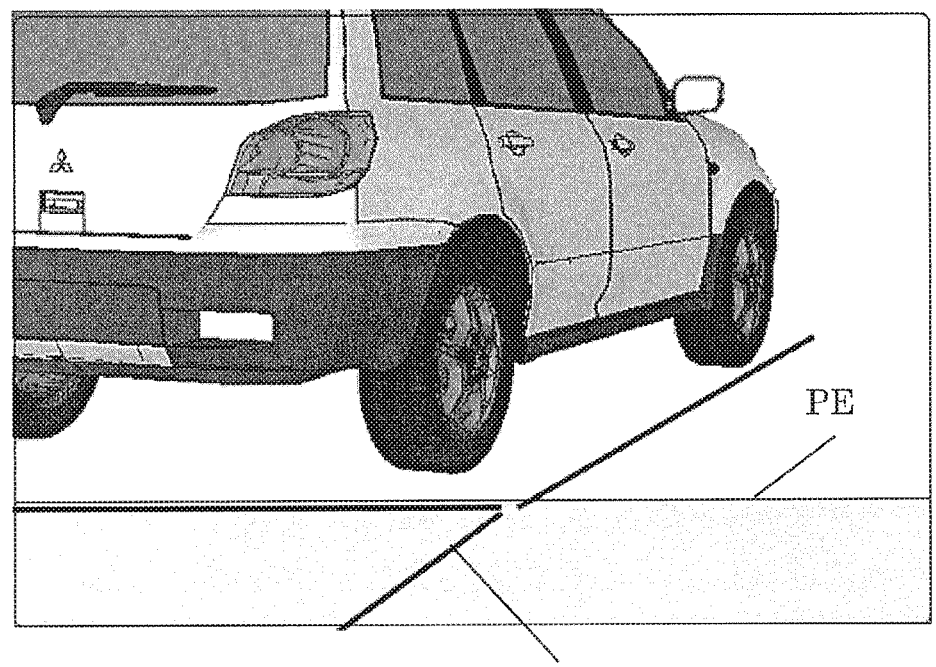
FIG. 19 is a diagram for illustrating an example of the displayed image photographed by the side-view video camera in the parking mode in the third embodiment of the present invention.

FIG. 18 is a diagram for illustrating an example of the displayed image photographed by the side-view video camera not in a parking mode in the third embodiment of the present invention. FIG. 19 is a diagram for illustrating an example of the displayed image photographed by the side-view video camera in the parking mode in the third embodiment of the present invention. A bottom part IV of the image of FIG. 18 cannot be seen due to the own vehicle. The situation of a vacant parking frame at the time of the parallel parking operation cannot be seen. In contrast, in FIG. 19, a bottom part PE of the image is displayed in a transparent manner, and the frame line 120 of a vacant parking frame can easily be seen.

According to the above-mentioned embodiments of the present invention, in the top-view image and each video camera image, which include a bird's eye view image and the like in a video camera for monitoring the periphery, the frame line of a road surface and the situation under the own vehicle, which become blind spots due to the own vehicle in the video camera image, are displayed in an overlapping manner through transparency processing of a part of the own vehicle and compensating for the part subjected to the transparency processing by the video camera image. With this, it is possible to provide the vehicle periphery image display apparatus and the vehicle periphery image display method, which enable the driver to easily recognize the situation of the own vehicle and the periphery of the parking frame, to thereby remove a deviation between the positions of the frame line and the own vehicle at the time of a parking operation of the own vehicle.

The video cameras 2FO, 2LE, 2RI, and 2RE serving as the photographing devices photograph the periphery of the own vehicle in the parking lot. The image signal input unit 11 continuously receives input of an image signal of a periphery image of the own vehicle photographed by the plurality of photographing devices 2. The history storage unit 20 stores the image signal, which has been input to the image signal input unit 11, as the periphery image for each of the plurality of photographing devices 2. The image compensation processing unit 14 compensates for, in the periphery image input to the image signal input unit 11, a lost image part by the periphery image stored in the history storage unit 20, and combines the compensated lost image part with the periphery image input to the image signal input unit 11. The top-view image generation unit 15 generates a top-view image seen from right above the top of the own vehicle based on the combined periphery image. The display image generation unit 16 generates a displayed image including the top-view image generated by the top-view image generation unit 15. The display monitor 6 then displays the displayed image generated by the display image generation unit 16.

The lost image part to be compensated for by the image compensation processing unit 14 is a part including a frame line or wheel stopper of a parking frame, and the image transparency processing unit 17 subjects the lost image part compensated for at the time of a parking operation to transparency processing so that the frame line or wheel stopper of the parking frame is seen in a transparent manner.

As an example of the case of the top-view image, the image compensation processing unit 14 compensates for, in the periphery image input to the image signal input unit 11, the image of a lost part of the own vehicle 100 at the center of the periphery image illustrated in FIG. 6, for example, by a previous image stored in the history storage unit 20. Then, the image compensation processing unit 14 combines the compensated image with the periphery image input to the image signal input unit 11. The top-view image generation unit 15 generates a top-view image based on the combined periphery image. Then, the image transparency processing unit 17 subjects the compensated image to transparency processing so that the frame line or wheel stopper of the parking frame can be seen in a transparent manner. Specifically, the image transparency processing unit 17 executes the transparency processing so that a contour 100e along the own vehicle 100 illustrated in FIG. 6 is left, and a part of the road surface including the frame line 120 of the parking frame under the own vehicle obtained through compensation can be seen on the inner side of the contour 100e in a transparent manner. With this, the driver can check the inclination of the own vehicle 100 with respect to the frame line 120 and the like based on display on the screen of the display monitor 6.

When the frame line/wheel stopper detection unit 13 detects the frame line or wheel stopper of the parking frame to determine a parking frame in which the own vehicle is to be parked based on the photographed periphery image, the parking state detection unit 18 acquires a distance between the own vehicle and the frame line or wheel stopper of the parking frame in which the own vehicle is to be parked based on the photographed periphery image. With this, the display image generation unit 16 generates the displayed image including the distance between the own vehicle and the frame line or wheel stopper of the parking frame.

The parking position road surface image extraction unit 12 extracts an image of a road surface of the parking frame in which the own vehicle is to be parked from the photographed periphery image based on the results of detection by the frame line/wheel stopper detection unit 13 and the parking state detection unit 18.

The image extracted by the parking position road surface image extraction unit 12 is subjected to compensation processing by the image compensation processing unit 14, and then subjected to the transparency processing by the image transparency processing unit 17, and the display image generation unit 16 generates the displayed image by using the top-view image, which is obtained by subjecting the image of the road surface of the parking frame in which the own vehicle is to be parked to the compensation processing and the transparency processing, or the periphery image photographed by the plurality of photographing devices 2.

The history storage unit 20 stores the periphery image photographed by the plurality of photographing devices 2 as a history, and the frame line/wheel stopper detection unit 13 detects the frame line or wheel stopper of the parking frame in which the own vehicle is to be parked, based on the periphery image of the history storage unit 20.

When the vehicle periphery image display apparatus looks for the parking frame in which the own vehicle is to be parked, the frame line/wheel stopper detection unit 13 detects a frame line into which the own vehicle is to be parked, by detecting a parking frame within a periphery image in each direction photographed by the plurality of photographing devices 2, a steering angle of a steering wheel of the own vehicle, gear information, and a space having a width equal to or larger than a width of the own vehicle in the parking frame, and detects a wheel stopper within the parking frame or detects an obstacle positioned in a parking direction when there is no wheel stopper.

The plurality of photographing devices 2 include video cameras mounted to front, rear, left, and right sides of the own vehicle.

In each of the above-mentioned embodiments, the image generation display control unit 30 indicated by the functional blocks illustrated in FIG. 1 may be constructed by separate control circuits, or may be constructed by one control circuit in an integrated manner.

Regarding this point, each of the processing circuits for implementing those functions may be constructed by dedicated hardware or a central processing unit (CPU, which is also referred to as "processing unit", "arithmetic unit", "microprocessor", "microcomputer", "processor", or "DSP") for executing a program stored in a memory.

Figure 20A:
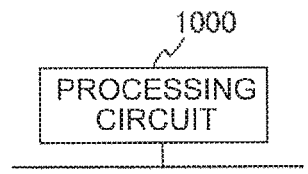
FIG. 20A and FIG. 20B are each a diagram for illustrating an example of a hardware configuration of a control unit in the vehicle periphery image display apparatus according to the present invention.
Figure 20B:
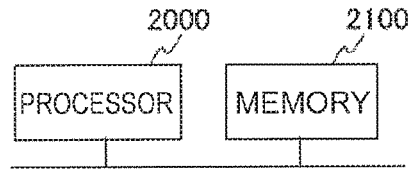

FIG. 20A and FIG. 20B are schematic illustrations of hardware configurations in a case where those functions are constructed by hardware and a case where those functions are constructed by software, respectively.

When the functions of the above-mentioned respective components are constructed by hardware illustrated in FIG. 20A, a processing circuit 1000 corresponds to, for example, a single circuit, a complex circuit, a programmed processor, a processor for a parallel program, an ASIC, an FPGA, or a combination thereof. The function of each component may be implemented by a processing circuit, or the functions of the components may altogether be implemented by a processing circuit.

When the functions of the above-mentioned respective components are constructed by a CPU illustrated in FIG. 20B, the functions of the respective components are implemented by software, firmware, or a combination of software and firmware. The software and the firmware are described as programs, and are stored in a memory 2100. A processor 2000, which is a processing circuit, reads out and executes the programs stored in the memory 2100, to thereby implement the functions of the respective components. Those programs may be considered as programs for causing a computer to execute the procedures and the methods of the respective components. In this case, the memory 2100 corresponds to, for example, a nonvolatile or volatile semiconductor memory such as a RAM, a ROM, a flash memory, an EPROM, or an EEPROM, or to a magnetic disk, a flexible disk, an optical disc, a compact disc, a MiniDisc, or a DVD.

The function of each component may be implemented partially by dedicated hardware, and partially by software or firmware.

In this way, the processing circuit can implement each of the above-mentioned functions by hardware, software, firmware, or a combination thereof.

Moreover, various types of information required for the processing are set to the circuit in advance in the case of the hardware configuration, and are stored in the memory in advance in the case of the software configuration.

INDUSTRIAL APPLICABILITY

The vehicle periphery image display apparatus and the vehicle periphery image display method according to the present invention can be applied to various fields and vehicles of various forms.

REFERENCE SIGNS LIST

2FO front-view video camera, 2RE rear-view video camera, 2LE, 2RI side-view video camera, 6 display monitor, 7 human interface (H/I), 10 image generation display processing unit, 11 image signal input unit, 12 parking position road surface image extraction unit, 13 frame line/wheel stopper detection unit, 14 image compensation processing unit, 15 top-view image generation unit, 16 display image generation unit, 17 image transparency processing unit, 18 parking state detection unit, 20 history storage unit, 21 image display control input unit, 30 image generation display control unit, 100 own vehicle, 120 frame line (parking frame), 1000 processing circuit, 2000 processor, 2100 memory

The invention claimed is:

1. A vehicle periphery image display apparatus, comprising:
   a display;
   at least one memory;
   a plurality of video cameras to photograph a periphery of an own vehicle in a parking lot; and
   at least one processor configured to:
   continuously receive a periphery image of the own vehicle from the plurality of video cameras;
   in response to determining that a speed of the own vehicle is lower than or equal to a predetermined speed and a plurality of arranged other vehicles is present in the periphery image, enter into a parking spot line detection state, and control the at least one memory to store the periphery image as a previously captured periphery image;
   based on gear information of the own vehicle or a distance from the own vehicle to a parking line of a parking spot captured in the periphery image, enter into a parking operation state, and combine the previously captured periphery image with the periphery image that is currently received from the plurality of video cameras to generate a combined periphery image;
   generate a top-view image seen from right above a top of the own vehicle based on the combined periphery image; and
   generate a displayed image including the top-view image,
   wherein the display is configured to display the displayed image.

2. The vehicle periphery image display apparatus according to claim 1,
   wherein the previously captured periphery image comprises the parking line or a wheel stopper of the parking spot, and
   wherein the at least one processors is further configured to perform transparency processing on the previously captured periphery image so that the parking line or the wheel stopper of the parking spot is seen in a transparent manner.

3. The vehicle periphery image display apparatus according to claim 2, wherein the at least one processors is further configured to:
   detect the parking line or the wheel stopper of the parking spot to determine the parking spot in which the own vehicle is to be parked, based on the photographed periphery image;
   obtain the distance between the own vehicle and the parking line or a distance between the own vehicle and the wheel stopper of the parking spot in which the own vehicle is to be parked, based on the photographed periphery image; and
   generate the displayed image including the distance between the own vehicle and the parking line or the wheel stopper of the parking spot.

4. The vehicle periphery image display apparatus according to claim 3, wherein the at least one processor is further configured to:
   extract an image of a road surface of the parking spot in which the own vehicle is to be parked from the photographed periphery image, based on the detected parking line or wheel stopper, and the distance between the own vehicle and the parking line or the wheel stopper.

5. The vehicle periphery image display apparatus according to claim 4, wherein the at least one processor is further configured to:
   perform compensation processing and then perform the transparency processing on the extracted image of the road surface of the parking spot;
   generate the displayed image by using the top-view image, which is obtained by performing the compensation processing and the transparency processing on the image of the road surface of the parking spot.

6. The vehicle periphery image display apparatus according to claim 3, wherein the at least one processor is further configured to:
   detect the parking line or wheel stopper of the parking spot in which the own vehicle is to be parked, based on the previously captured periphery image.

7. The vehicle periphery image display apparatus according to claim 4, wherein the at least one processor is further configured to:
   detect the parking line or wheel stopper of the parking spot in which the own vehicle is to be parked, based on the previously captured periphery image.

8. The vehicle periphery image display apparatus according to claim 5, wherein the at least one processor is further configured to:
   parking line or wheel stopper of the parking spot in which the own vehicle is to be parked, based on the previously captured periphery image.

9. The vehicle periphery image display apparatus according to claim 3, wherein the at least one processor is further configured to:
   in the parking spot line detection state, detect the parking line of the parking spot into which the own vehicle is to be parked, based on the parking spot captured in the periphery image photographed by the plurality of video cameras, a steering angle of a steering wheel of the own vehicle, the gear information, and a space having a width equal to or larger than a width of the own vehicle in the parking spot, and detect the wheel stopper within the parking spot or detect an obstacle positioned in a parking direction when there is no wheel stopper.

10. The vehicle periphery image display apparatus according to claim 4, wherein the at least one processor is further configured to:
    in the parking spot line detection state, detect the parking line of the parking spot into which the own vehicle is to be parked, based on the parking spot captured in the periphery image photographed by the plurality of video cameras, a steering angle of a steering wheel of the own vehicle, the gear information, and a space having a width equal to or larger than a width of the own vehicle in the parking spot, and detect the wheel stopper within the parking spot or detect an obstacle positioned in a parking direction when there is no wheel stopper.

11. The vehicle periphery image display apparatus according to claim 5, wherein the at least one processor is further configured to:
    in the parking spot line detection state, detect the parking line of the parking spot into which the own vehicle is to be parked, based on the parking spot captured in the periphery image photographed by the plurality of video cameras, a steering angle of a steering wheel of the own vehicle, the gear information, and a space having a width equal to or larger than a width of the own vehicle in the parking spot, and detect the wheel stopper within the parking spot or detect an obstacle positioned in a parking direction when there is no wheel stopper.

12. The vehicle periphery image display apparatus according to claim 6, wherein the at least one processor is further configured to:
   in the parking spot line detection state, detect the parking line of the parking spot into which the own vehicle is to be parked, based on the parking spot captured in the periphery image photographed by the plurality of video cameras, a steering angle of a steering wheel of the own vehicle, the gear information, and a space having a width equal to or larger than a width of the own vehicle in the parking spot, and detect the wheel stopper within the parking spot or detect an obstacle positioned in a parking direction when there is no wheel stopper.

13. The vehicle periphery image display apparatus according to claim 1, wherein the plurality of video cameras include video cameras mounted to front, rear, left, and right sides of the own vehicle.

14. The vehicle periphery image display apparatus according to claim 2, wherein the plurality of video cameras include video cameras mounted to front, rear, left, and right sides of the own vehicle.

15. The vehicle periphery image display apparatus according to claim 3, wherein the plurality of video cameras include video cameras mounted to front, rear, left, and right sides of the own vehicle.

16. The vehicle periphery image display apparatus according to claim 4, wherein the plurality of video cameras include video cameras mounted to front, rear, left, and right sides of the own vehicle.

17. The vehicle periphery image display apparatus according to claim 5, wherein the plurality of video cameras include video cameras mounted to front, rear, left, and right sides of the own vehicle.

18. The vehicle periphery image display apparatus according to claim 6, wherein the plurality of video cameras include video cameras mounted to front, rear, left, and right sides of the own vehicle.

19. The vehicle periphery image display apparatus according to claim 9, wherein the plurality of video cameras include video cameras mounted to front, rear, left, and right sides of the own vehicle.

20. A vehicle periphery image display method, comprising:
   continuously inputting a periphery image of an own vehicle in a parking lot, which has been photographed by a plurality of video cameras;
   in response to determining that a speed of the own vehicle is lower than or equal to a predetermined speed and a plurality of arranged other vehicles is present in the periphery image, entering into a parking spot line detection state, and storing the periphery image as a previously captured periphery image;
   based on gear information of the own vehicle or a distance from the own vehicle to a parking line of a parking spot captured in the periphery image, entering into a parking operation state, and combining the previously captured periphery image with the periphery image that is currently received from the plurality of video cameras to generate a combined periphery image;
   generating a top-view image seen from right above a top of the own vehicle based on the combined periphery image;
   generate a displayed image including the top-view image; and
   displaying the generated displayed image.

* * * * *